March 10, 1964 O. B. SNEATH 3,124,658

SELECTIVE CALL SYSTEMS

Filed Feb. 24, 1959 5 Sheets-Sheet 1

INVENTOR
Oswald Barber Sneath
BY
Stevens Davis Miller & Mosher
ATTORNEY

INVENTOR
Oswald Barber Sneath
BY
Stevens Davis Miller & Mosher
ATTORNEYS

INVENTOR
Oswald Barber Sneath
BY
Stevens Davis Miller & Mosher
ATTORNEYS

March 10, 1964 O. B. SNEATH 3,124,658

SELECTIVE CALL SYSTEMS

Filed Feb. 24, 1959 5 Sheets-Sheet 4

INVENTOR

Oswald Barber Sneath

BY

Stevens Davis Miller & Mosher

ATTORNEYS

INVENTOR
Oswald Barber Sneath
BY
Stevens Davis Miller & Mosher
ATTORNEYS

United States Patent Office 3,124,658 Patented Mar. 10, 1964

3,124,658

SELECTIVE CALL SYSTEMS

Oswald Barber Sneath, London, England, assignor to Multitone Electric Company Limited, London, England Filed Feb. 24, 1959, Ser. No. 794,933
Claims priority, application Great Britain Feb. 28, 1958
1 Claim. (Cl. 179—84)

Figure 1:
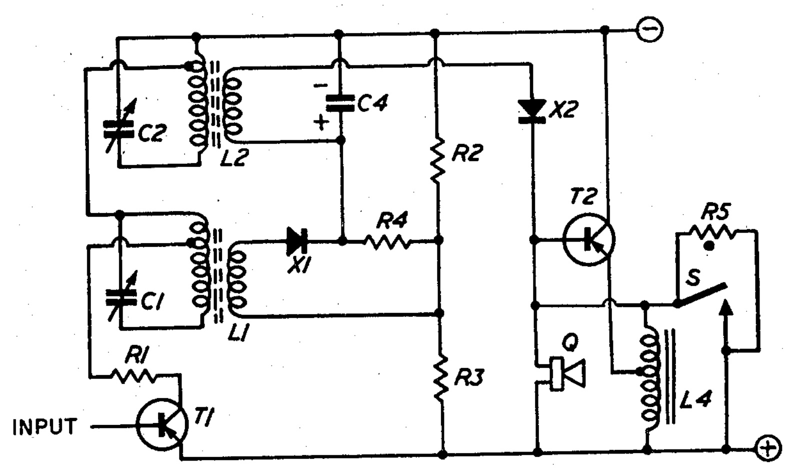

This invention relates to receiving apparatus for use in a system in which one or more of a large number of receivers can be selectively called by transmitting a corresponding call signal which is received by means of low frequency magnetic, or electrostatic induction. The invention is an improvement in or modification of the invention forming the subject of copending application for patent Ser. No. 658,148 hereinafter referred to as the parent specification, and has for its object to enable a large number of different selective calls to be sent out, without calling for a very high degree of frequency selectivity, or stability.

According to this invention, each receiver is operated by two or more pulses sent out in succession, each pulse comprising a train of oscillations of a certain frequency, and a different receiver will be operated according to the order, as well as the combination, of the frequencies sent out. Any permutation of frequencies can be employed, provided that the same frequency does not occur twice without a different frequency in between. If the transmitter is capable of sending out pulses of 10 different frequencies, then with receivers operating on two pulses 10×9, i.e. 90 calls can be made. If three frequencies are used, 10×9×9, i.e. 810 calls can be made. With a transmitter capable of transmitting 12 different frequencies, 12×11, i.e. 132 calls are available with two pulses, or 12×11×11, i.e. 1,452 distinct calls with three pulses.

Five different forms of the invention will hereinafter be described.

In the first, the sending out of two or three pulses triggers off a signalling device which continues to operate until interrupted manually.

In the second, the action of the signalling device will terminate automatically after a suitable length of time.

In the third form the operation of the signalling device will terminate shortly after the termination of the last of the pulses required to operate it. The last pulse may then be of considerable duration and be interrupted to send out simple code signals, such as a series of dots, or dashes. In this case, if the oscillation is interrupted for a short time, e.g. less than a second, and then continued, the note emitted by the signalling device will stop, but will be resumed when the signal being sent out is resumed. When, however, it is interrupted for longer periods, the receiver will not respond unless recalled by the proper permutation of the frequencies. The object of the codes may be either to distinguish between several persons using receivers operated by the same permutation of frequencies (which may in some cases be a useful arrangement for an executive and his assistant), or to give further information to the individual called, e.g. who wants him and where he is wanted. The use of codes is also required in the case of receivers which can be switched to speech—to indicate if the person called is going to be spoken to over the system, or, for example, is wanted on the telephone. Apart from any coding requirements, a repeated short interruption to an audible signal will generally increase the awareness value of the note.

In the fourth form of the invention, the last of the pulses is either of a note within the audio range, or consists of speech. Instead of triggering off, or maintaining in operation a separate signalling device, the pulse itself is applied to a sound reproducer. Where only notes are transmitted, this last pulse may form one of the elements in the permutation, but where speech is sent out, the number of permutations will depend only on the previous pulse trains. In the case of speech the permutation available will depend only on the previous frequencies. As in the third form of the device, the operation may persist over short interruptions of the final signal. However, if speech is used, care will be required on the part of the operator, both to start speaking almost immediately the previous signal is terminated, and to keep intervals between words short. This arrangement may prove satisfactory where only short messages are to be sent over the system, but where prolonged speech is required to be sent out, a note may be superimposed on the speech in order to retain the gates open during pauses. This may consist of an ultrasonic, or high sonic frequency, that will cause very little disturbance to the speech, as the sound producer of the receiver can be relatively insensitive to it; if necessary, filters can be provided for keeping it out of the sound-reproducer. In addition, or alternatively, provision may be made in the transmitter for the speech signal shutting off this frequency during the actual time words are being transmitted.

The fifth form of the invention enables speech to be transmitted by modulation of the last of the frequencies sent out, which, instead of triggering off the signalling device, is rectified and the modulation signal fed to a sound-reproducer. Provided the frequencies employed are sufficiently high, the number of channels may remain the same as previously, the carrier frequency for speech being included in the permutation. In this case it is necessary for the modulation side bands to be relatively weak with regard to the carrier freqnency, in which case they will not trigger off other receivers. As the top frequency cut-off of the speech can be around 3,000 cycles, it is possible for carrier frequencies as low as about 8,000 cycles to be used. In this form the operation of the signalling device will continue so long as the carrier frequency continues, and will terminate either directly, or with a short delay, after termination of the carrier frequency, so that the receiver will only respond again after the complete permutation of frequencies is transmitted.

An alternative arrangement, which in many cases will be found more convenient, is to employ a fixed carrier frequency for speech, the selection being determined only by the preceding pulses. The carrier frequency may conviently be higher than any of the preceding pulses. A filter need not in this case be employed for the carrier frequency. The output signal to the speed rectifier may be obtained either from an inductance, or resistance in series with the selective filters. As the transistor in whose collector circuit the filters are incorporated acts as a limiter, it might appear that the modulation of the carrier would be eliminated in this circuit. In practice, however, the limiting, while adequate for the purpose required, will not normally be complete, and sufficient modulation will be available to produce speech over a considerable range of signal inputs to the limiter stage. The degree of modulation from this stage may be improved by having a resistance capacity input to the limiter stage with a time constant of the order of 10 milliseconds, so that the bias of this stage will vary the signal strength at a slow rate compared with normal speech frequencies. In this case the limiting is controlled by the input resistance and the resistor in the collector circuit should be omitted.

This invention has the advantage that very simple apparatus may be employed for sending out the calls, even when a large number of people are on call. The transmitter need comprise only an oscillator, which may be made to operate at one of a number of frequencies by pressing a suitable button. Thus, with a row of 10 buttons on the transmitter, any of 810 people can be called, merely by pressing two of the buttons one after another for a fraction of a second, and then pressing a third button (or the first one again) and holding it down, if necessary for so long as the call is required, or transmitting a code with it. In this case, the receivers should be such that an interval of up to about a second be permissible between the sending out of the respective frequencies, whereas an interval of several seconds should elapse between the termination of one call and the start of another.

When the fourth form of the invention is employed with speech, the output from a speech amplifier in the transmitter is substituted at the end of the signal for the output of the oscillator, either by holding down an additional button, or by means of a switch.

When the fifth form of the invention is used, either a suitable call note, or a speech signal, is used to modulate the oscillator at the transmitter. The modulator may be permanently in circuit and may be brought into use by speaking into the microphone when the button for the last required frequency is pressed, or by operating a switch, or an additional button, to give a call note.

In an improved version of the transmitter it can be arranged that on pressing one button the frequencies associated with it will continue until another button is pressed, when it will change to the frequency corresponding to the new button, with only a very short interruption. A modified form of this arrangement, where a large number of frequencies are employed, e.g. 22 frequencies in a 2-gate transmitter is as follows: 11 buttons only are employed for sending out the frequencies, but on the pressing of any button either of two adjacent frequencies may be sent out, according to the setting of relays. Before pressing the two buttons which actually send out the required frequencies, either (or none) of three additional buttons must be pressed, which will cause the higher of the two frequencies associated with each button, to be sent out on the first, second, or both occasions, respectively. When none of the additional buttons is pressed, the lower of the two frequencies will be sent out on both occasions.

The use of this system in the transmitter will enable somewhat shorter time constants to be used in the receiver, as the interval between the different frequencies can be kept shorter than will sometimes be the case when the simpler form of transmitter is used.

A still more elaborate form of transmitter may also be employed, in which the call frequencies are first selected by press buttons (or dialed on a telephone dial) and are stored and sent out automatically when the system is free.

The receiver consists essentially of an electromagnetic pick-up device, such as a coil wound on a ferrite rod, followed by an amplifier, terminating in a limiter stage, which will be loaded up by any signal received, followed by two or three frequency-selective filters. In the case of the two-pulse receiver, the first pulse is passed by one of the filters to open a gate, which stays open for a short interval and while open allows a signal from the second filter to operate a signalling device. For example, in the first three forms the signalling device may comprise an oscillator connected to a sound-producing transducer, in the fourth form—a sound-producer, possibly preceded by an amplifier; in the fifth form—a rectifier connected, with or without amplification, to a sound-producer to be operated by a modulation signal. In the case of the third, fourth and fifth forms of the invention, feedback from the last frequency sent out, after passing through the gate, serves to hold the gate open for the last frequency for so long as it is sent out. Alternatively, in the third form this may be effected by feedback from the triggered oscillation. As illustrated with reference to FIG. 7 the triggered oscillation may serve to hold the gate open for the third oscillation, without the need for additional components in the circuit.

Several alternative arrangements are possible in the case of the three-pulse system. For example, the first pulse may be used to charge a condenser and the second pulse may generate a charge superimposed on this first charge; alternatively, the first pulse may serve to block an escape path for the second pulse; or the first pulse may serve to generate bias, or supply voltage that opens a path for the second pulse, which itself may in similar manner open a path for the third pulse, or speech carrier. A modified form of the 3-pulse transmitter is where the first two pulses may, as previously, each be one of a number of frequencies, while the third pulse consists of a constant frequency carrying speech, or call note modulation. The filter for the third pulse will then have to be sufficiently broadly tuned in the case of speech—to allow through the audio band required.

Embodiments of this invention are described with reference to FIGS. 1 to 9 of the accompanying drawings. In each of these embodiments the initial part of the receiver consists of a pick-up coil and amplifying stages, terminating in a limiter stage T1, in accordance with the specification of said copending application, above referred to. It is, however, necessary that the pick-up coil and amplifier should cover either the whole range of frequencies to be employed, or the several frequencies to be employed in a particular receiver, without excessive variation in sensitivity. The limiter stage T1 has in its output circuit a limiting resistance and a plurality of selective circuits, as described in relation to the various embodiments.

FIG. 1 illustrates a 2-gate receiver. A signal from a pick-up coil is amplified and applied to the base of the transistor T1, in the collector circuit of which are connected in series a resistance R1 and parts of the primaries of ferrite-cored transformers L1 and L2. The primaries of the transformers L2 and L1 are tuned with condensers C1 and C2. The latter are shown variable, but may alternatively be fixed and permeability tuning employed on L1 and L2. The object of using the taps on these primary windings is to enable a suitable impedance to be obtained in the transistor circuit and at the same time enable relatively small capacity condensers to be used.

The signal current in the secondary of L1 is rectified by a rectifier X1 connected to the positive side of a condenser C4. The rectified signal serves to bias the positive side of rectifier X1 positive with regard to the junction of R2 and R3, i.e. less negative with respect to the emitter of a transistor T2. The secondary of L2 serves to supply an alternating potential to a rectifier X2, but as the voltage is comparatively small, no current will flow if this point has a strong negative bias with regard to the positive supply, and hence to the emitter of T2. When, however, a signal from the transformer L1 is followed by a signal from the transformer L2, pulses pass through the rectifier X2 and cause the transistor T2, coupled to a squegging transformer L4, to burst into oscillation, which produces a signal in a small sound-producer, Q.

The above oscillation will continue until stopped by the closing of a switch S. On opening the switch S, the oscillation will not start until it is again excited by pulses through the rectifier X2 as there is no negative bias on the base of T2. The maximum interval that can occur between the two pulses operating the receiver is determined by the time constant of the condenser C4 and the resistances R2, R3 and R4.

Alternatively to the above, the oscillation may be caused to terminate automatically after a few seconds. This can be done by connecting a resistance R5 with a low thermal capacity and high negative temperature coefficient across the transformer L4, or taps on it. Until T2 starts oscillating, there will be only a slight direct current through R5. When oscillation commences, the alternating current will cause the resistance to fall until the oscillation is damped out. Oscillation will not commence again until a new train of pulses is received.

Figure 2:
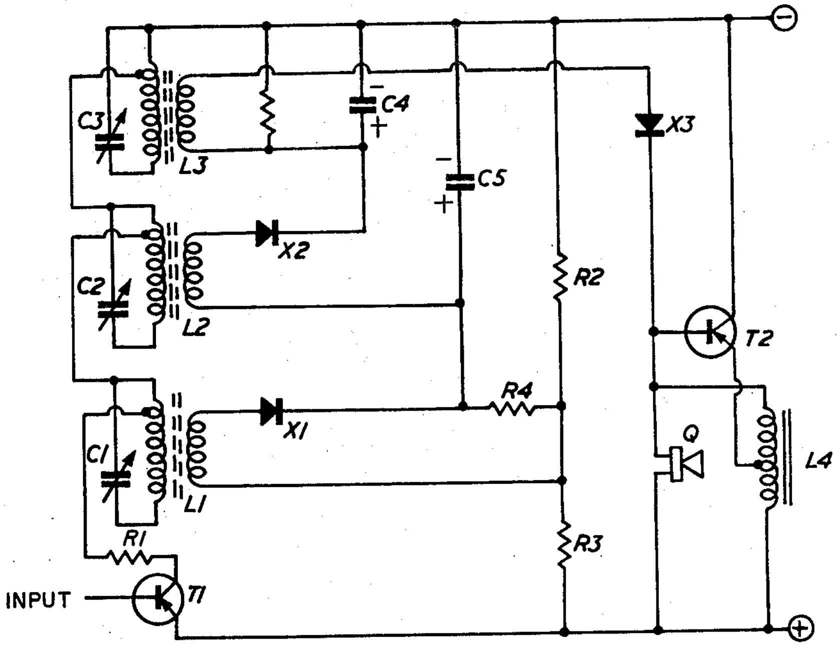

FIG. 2 shows an elaboration of the circuit of FIG. 1, suitable for three pulse operation. Here the first pulse must be of the frequency to which the transformer L1 is tuned. This pulse is rectified by the rectifier X1 and serves to reduce the negative charge with respect to positive supply on the negative side of the condenser C5, to which it is connected. The following pulse to which L2 is tuned, will then cause the rectifier X2 to reduce the negative charge of the condenser C4 to below that of C5 and, with suitable values, this will then cause the third pulse, to which L3 is tuned, to cause current to pass through the rectifier X3 and trigger off the transistor T2. The same change in the charge of C5 will not be produced if the pulses to which L1 and L2 are tuned arrive in a different order. The oscillation in L4 can be stopped in the same manner as that described with reference to FIG. 1.

Figure 3:
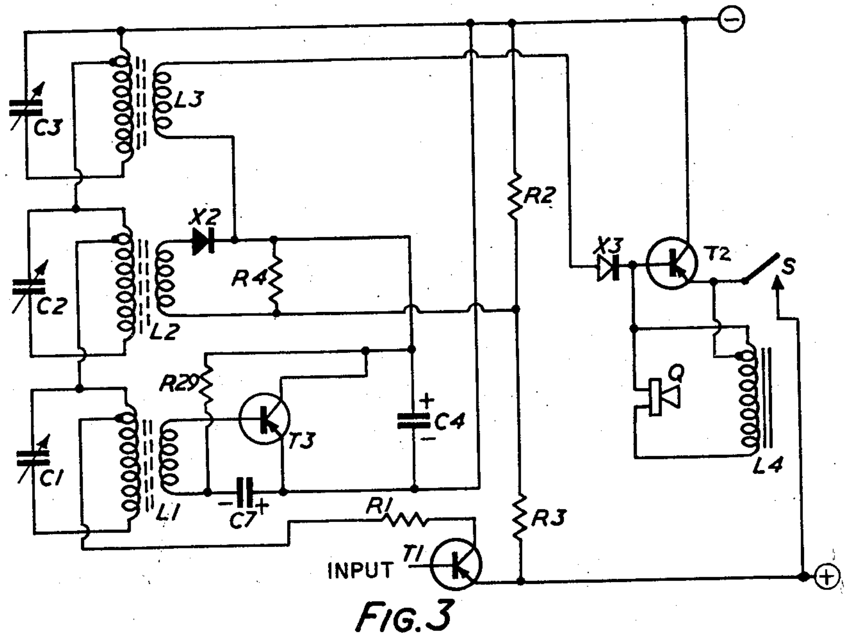

FIG. 3 shows an alternative arrangement for a three pulse receiver. In this case the first pulse, to which L1 is tuned, is applied to the base of transistor T3 and is rectified charging the condenser C7, this charge escaping only slowly through the resistor R29. On the conclusion of the signal the base of the transistor is left with a positive bias with respect to the emitter, so that transistor T3 does not pass collector current. This enables a second pulse, to which L2 is tuned, to change the charge on condenser C4 so that the junction of C4 and rectifier X2 becomes positive with respect to the junction of R2 and R3. This will then cause the third pulse to which L3 is tuned, to start oscillation in the circuit associated with L4, as previously described. This circuit has an advantage over that of FIG. 2 in that it is less critical as to the voltages of the pulses from the transformers, although an extra transistor is required. The call may in this case be terminated either manually, by switch S, or by means of a timing device, as previously described.

Figure 4:
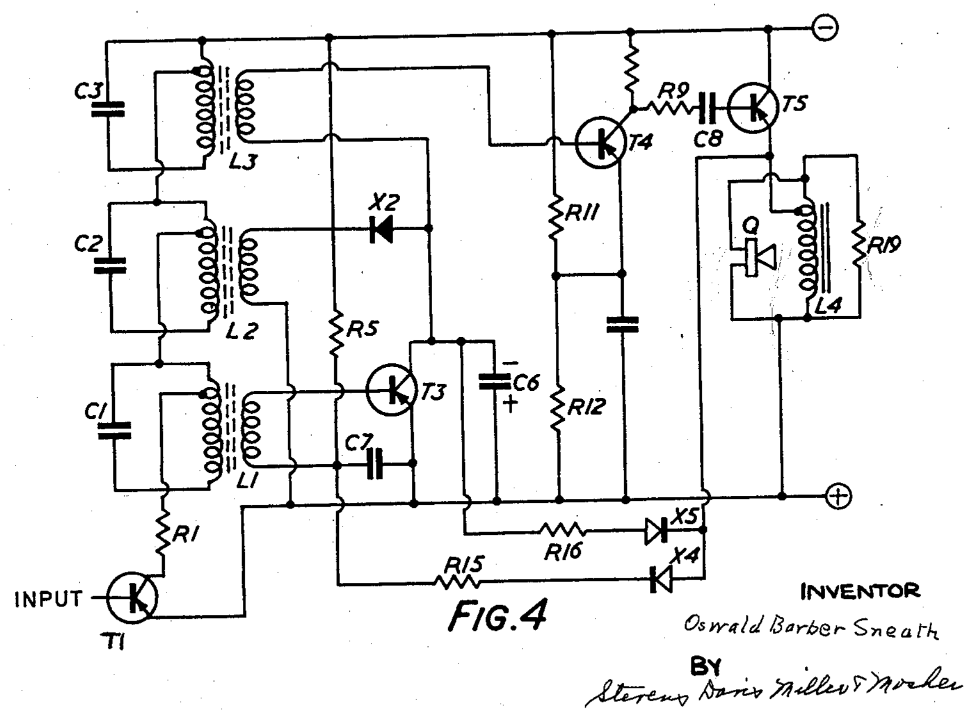

FIG. 4 shows a form of the invention in which the call is continued only for the duration of the third oscillation and, if desired, with short interruptions for coding. The procedure for initiating the call is somewhat similar to that described with reference to FIG. 3. The first pulse serves to bias off the transistor T3 as previously, but the second pulse from the transformer L2 is now rectified by the rectifier X2 so as to bias its junction with condenser C6 negative, and this negative charge is only retained if transistor T3 is biassed off. This renders operative the transistor T4 which was previously biassed off by the emitter being maintained negative with regard to the base by the resistances R11 and R12. The signal from the transformer L3 will then be amplified by the transistor T4 and fed to the transistor T5 via the resistance R9 and the condenser C8. This causes the transistor T5 to oscillate with the transformer L4. The damping, largely due to the resistance R19, is such that oscillation will only continue for as long as the signal is being fed in. However, so long as the signal from L3 continues, the oscillation of T5 is rectified and a positive voltage is fed through the rectifier X4 and resistor R15 to bias off the transistor T3, and a negative voltage through X5 and R16 serves to maintain the gates open. When the signal from L3 is interrupted, the gate will close, the time factor depending on condensers C6 and C7 and the resistance R5.

Figure 5:
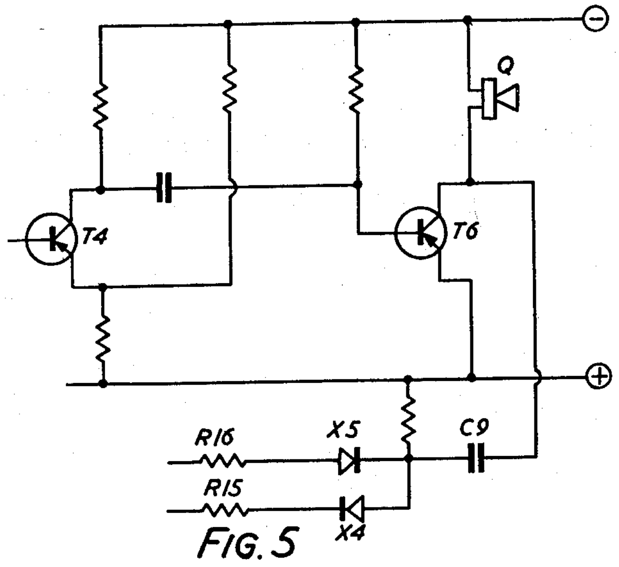

FIG. 5 shows a modification of FIG. 4 in which the circuit up to transistor T4 remains unchanged and in which the signal, after amplification by T4, as previously, is fed to the transistor T6, where it is further amplified, to operate the sound-producer Q, part of the output being taken from the collector of the transistor T6 through condenser C9 and rectifiers X4 and X5 to keep the gates open, as in FIG. 4. If only call notes are required, L3 can be made to tune to any suitable audible frequencies. If it is desired to receive speech, L3 must be tuned to cover a suitable region of the speech band. Frequencies within this band may be used for the signals to which L1 and L2 are tuned, if care is taken that the speech signals are never allowed to contain a substantial part of their energy at one of these frequencies for long enough to open the gates.

Figure 6:
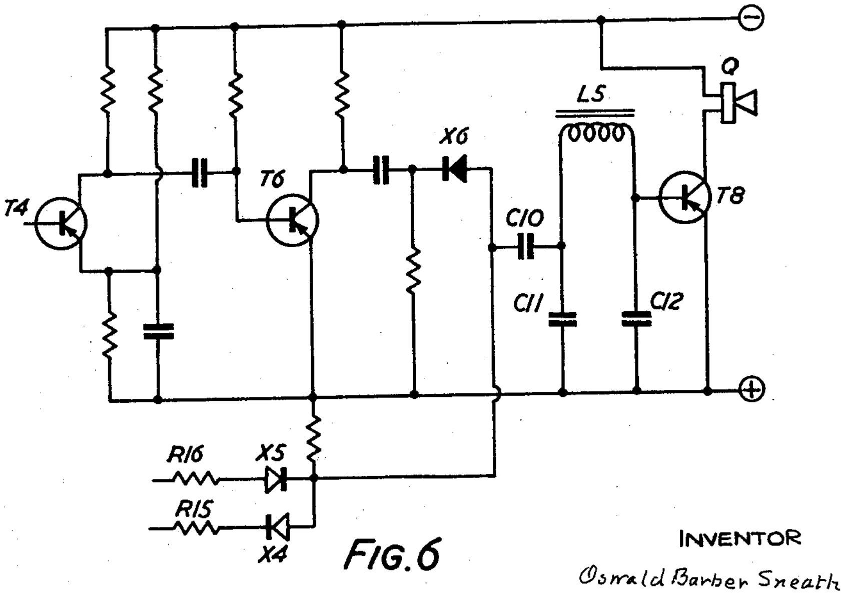

FIG. 6 shows a modification of the circuit of FIG. 5 suitable for the reception of speech, which is superimposed as modulation on the last oscillation. Here the output from transistor T6, while it serves to keep the gates open as in FIG. 5, is rectified by the rectifier X6 and the rectified signal, after passing through the filter constituted by condensers C10, C11, and C12, and inductance L5 is amplified by the transistor T8, so that the carrier speech operates the speech-reproducer Q. This speech-reproducer should preferably emphasise the middle frequencies attenuated by the transformer L3.

Figure 7:
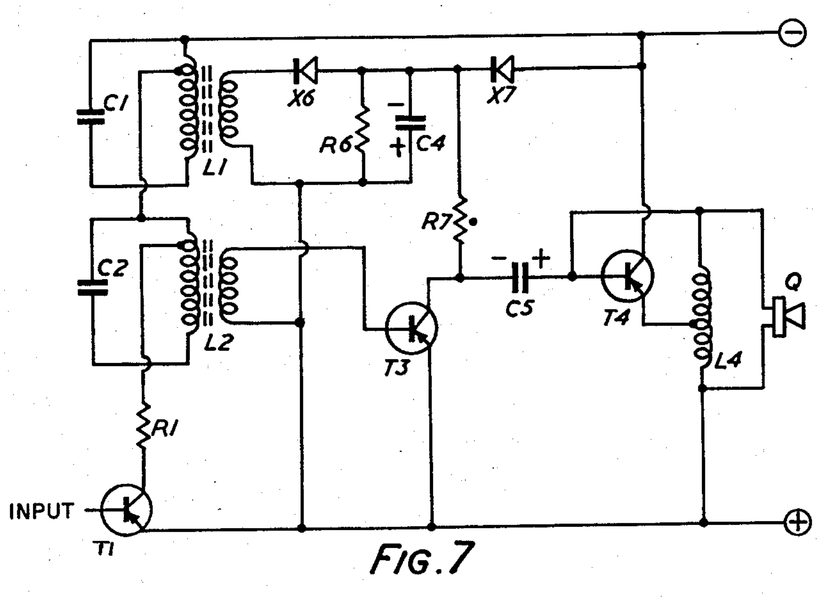

FIG. 7 shows a form of the invention in which the call is continued only for the duration of the second of two signals, with short interruptions which will allow for coding. The coil L1 is tuned to the first pulse to be sent out and the oscillation from this serves to apply bias through rectifier X6 to the condenser C4. The charge on this condenser serves as the power supply for the transistor T3. As the base of the transistor T3 has a low resistance path to emitter, through the secondary of the tuned coil L2, very little current will pass through this transistor in the absence of a signal and the condenser will remain charged for a time depending on the value of the resistance R6. The transistor T4 is connected to the auto-transformer L4 (across which is a sound-reproducer Q), which causes it to undergo a series of relaxation oscillations, which in some conditions will approximate to a steady oscillation, if a signal is applied to it. Normally no oscillation will occur in the circuit of T4 and L4, as there is no negative bias on the base of T4. When, however, a signal is fed to the base through the condenser C5, oscillation will occur in this circuit, at a frequency depending on the characteristics of L4 and Q rather than the initiating signal, in the same manner as in the signal-generating circuit of the parent specification. The damping introduced by the coupling to the resistance R7 through the condenser C5 is, however, sufficient to cause the squeg oscillation to be damped out when the applied signal ceases. When the second frequency, to which L2 is tuned, is received sufficiently soon after the first frequency and there is still a charge on C4, the second signal is amplified by the transistor T3 and causes transistor T4 to oscillate. When, however, the transistor T4 oscillates, the signal fed back through the condenser C5 is rectified by the transistor T3 and causes the collector of this transistor to retain a negative voltage with regard to its emitter for the greater part of the cycle. This causes T3 to continue to amplify the signals fed to its base from L2 and the condenser C4 will remain charged. Accordingly, the apparatus will function if the signal is broken for a short period. If, however, it is broken for long enough for the condenser C4 to discharge, T4 will not be triggered until both pulses have again been transmitted. It may be found that owing to the relatively high peaks introduced by the relaxation oscillation in L4, the voltage generated across C4 is more than is required for the efficient operation of the circuit and the rectifier X7 is connected between the negative side of C4 and the negative battery supply in such a sense that the voltage across C4 cannot appreciably exceed the battery voltage.

Figure 8:
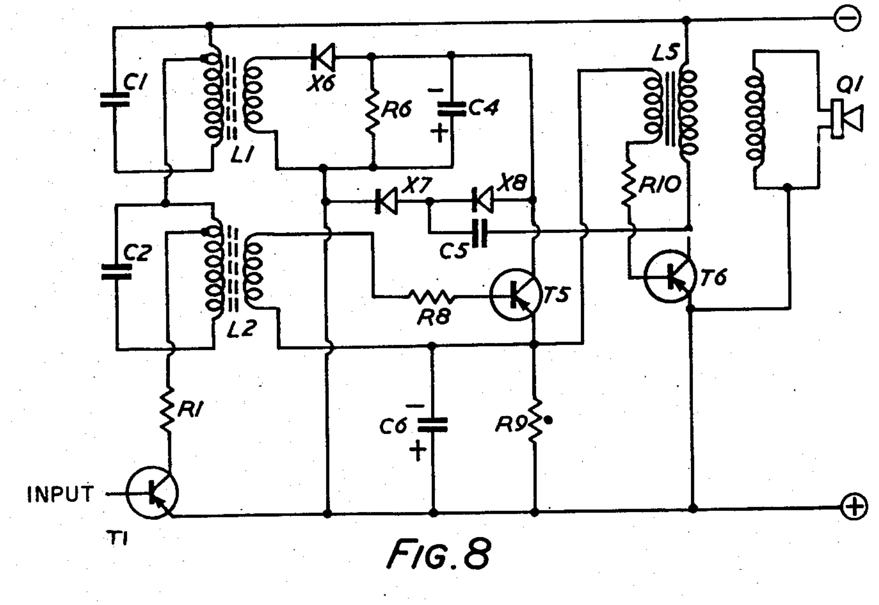

FIG. 8 illustrates a form of the invention operated in the same manner by two pulses, which is suitable where a very loud signal note is required. A crystal transducer is employed together with an additional transistor before the oscillatory stage. The first pulse from L1 serves to charge up the condenser C4, as in FIG. 7. This condenser supplies the negative voltage for transistor T5 and the second pulse from L2 allows T5 to pass current, thereby charging up the condenser C6. When there is sufficient charge on the condenser C6, the base of the transistor T6 becomes negative in relation to the emitter and this transistor goes into oscillation in conjunction with transformer L5, which produces positive feedback between its collector and base circuits. A third winding on the transformer L5 has connected across it a piezo electric transducer Q1, which constitutes in conjunction with the winding, a tuned circuit. The resistance R10 serves to prevent excessive base current and increases the efficiency of the circuit. The resistance R9 serves to discharge the condenser C6 and also limit the negative charge acquired by it. It is found advantageous that this resistance should have a negative temperature coefficient as the leakage current through T5 increases with temperature and, at the same time, the negative voltage on the base of T6 required to initiate oscillation is reduced. When T6 oscillates the condenser C5, in conjunction with the rectifiers X7 and X8, serves to maintain the negative bias on C4. Oscillation, accordingly, continues for so long as the signal continues to be applied to T5 from the transformer L2.

Figure 9:
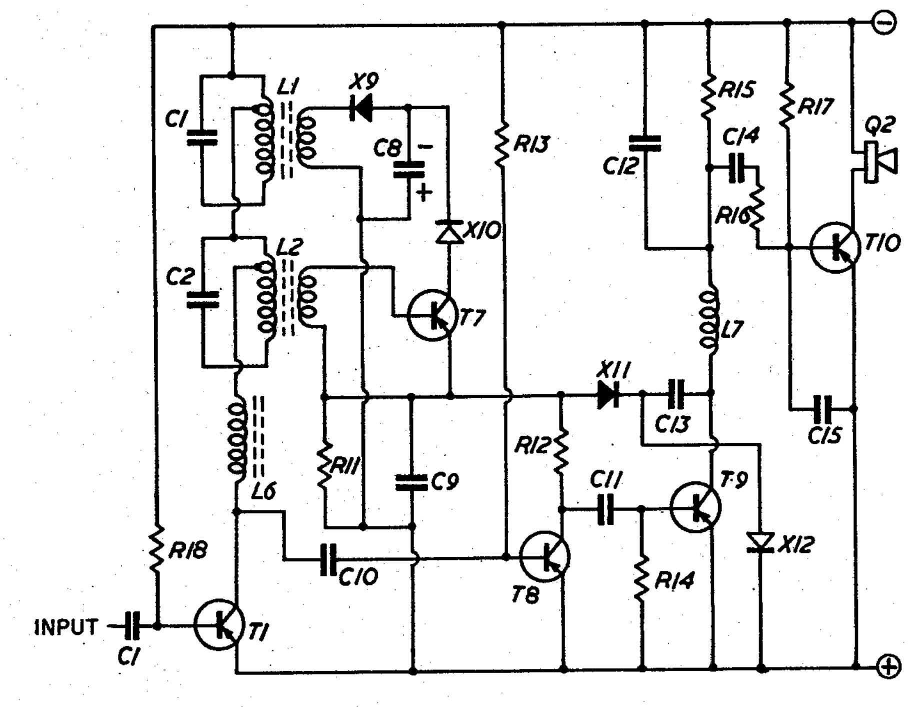

FIG. 9 illustrates a form of the invention operated by two pulses followed by a carrier frequency, which may be common to all receivers, modulated with a call note and/or speech. The incoming signal is fed through the condenser C7 to the base of the transistor T1, the base being connected to the negative of the supply through the resistance R18. The time constant of the condenser C7 and the resistance R18 should be of the order of 10 milliseconds so that the limiting effect of this circuit will not suppress speech modulation frequencies superimposed on a higher frequency carrier. The first pulse, to which the transformer L1 is tuned, is rectified by the rectifier X9 to charge the condenser C8. When a subsequent pulse, to which L2 is tuned, arrives it is applied to the transistor T7 and allows the negative charge on C8 to pass through the rectifier X10 and the transistor T7—to charge the condenser C9, which retains its charge for a time depending on the values of C9 and R11. The charge on C9 provides the supply voltage for the transistor T8 which amplifies the subsequent high frequency signals passing through the condenser C10 from the collector side of the choke L6. Bias to the base of T8 is fed by the resistor R13, which in many cases may advantageously be connected to the positive instead of negative, as the distortion of the carrier frequency resulting from this is immaterial. The signals applied to the transistor T8 are amplified by this transistor, which has a resistor R12 in its collector circuit, and are then fed through the condenser C11 to the base of the transistor T9, the resistor R14 being connected between the base and the emitter. The signals are amplified, as well as rectified by the transistor T9, in the collector of which there is a choke L7 in series with the resistor R15, shunted by the condenser C12. The amplified carrier frequency in the collector of T9 is coupled through the condenser C13 to the rectifiers X11 and X12, which serve to maintain the supply voltage across C9 for so long as the carrier signal continues to reach T9. The rectified speech frequency signal from T9, generated across the resistor R15, is fed through the condenser C14 and the resistor R16 to the base of T10, which is supplied with negative bias through the resistor R17. The choke L7, the condenser C12, the resistor R16 and the condenser C15, together form a filter for eliminating the carrier frequency from the base of T10. The collector circuit of T10 energises the sound-reproducer Q2. It will be appreciated that this circuit is capable of numerous modifications in accordance with known practice, e.g. various modifications may be made to the rectifying and filter circuits for the carrier frequency, and the choke L7 may be replaced with a resistor.

Functional modifications may be made to the circuit by taking the input of the condenser C10 from the secondary of an additional tuned filter, similar to L1 and L2, but sufficiently damped (for example, with a shunt resistance) to pass adequate side-bands for the audio frequency signal. In a more elaborate embodiment of the invention the input to C10 may be obtained from a substantially independent H.F. amplifier of known design, with automatic gain control.

It will not normally be necessary for any of the transistors to operate at more than 10 to 20 milliwatts. It may, however, be desirable to have T6 in FIGS. 5 and 6, T8 in FIG. 6, and T6 in FIG. 8, as well as T9 in FIG. 9, with a 50 milliwatt rating, or higher if loud signals or loud speech is required.

In all the circuits described, transformers L1 to L3 may conveniently consist of small ferrite-cord transformers, which should have Q's of about 30, if about a dozen frequencies are required to be used in the range of 6 kcs. to 15 kcs. The ratios of these transformers will depend on the transistors used and the current at which it is required to operate them, as well as the values of capacitors C1 and C2. For example, if C1 and C2 are 1,000 pf. and T1 operates from 1.3 volt with a current of about 150 microamps, R1 being around 6.8 kilohms, the tap on the tuned winding may be around 5% of the whole winding. The secondaries of these transformers in FIGS. 1, 2 and 3 may be around 2.5% of the tuned winding. In FIG. 4 suitable values for the secondaries would be 5% for L1 and L2 and 2% for L3. In FIGS. 7 and 8 suitable values for the secondaries would be 4.5% for L1 and 1.5% for L2. In FIG. 9, 3% would be suitable values for the secondaries of L1 and L2 and the choke L6 should be of such inductance as to have an impedance of around 3,000 ohms at the speech carrier frequency, while choke L7 could be of similar, or somewhat higher inductance.

The transformer L4 in FIGS. 1, 2, 3, 4 and 7 will have values depending on the impedance of the sound-reproducer Q and the operating voltage. For 1.3 volts and impedance for Q of about 600 ohms at 1,000 cycles, the transformer may consist of about 1,200 turns, tapped at 800 turns (the start of the winding being that taken to the positive), laminated with radio metal, ungapped, with a cross section of about 1/50 sq. in. (approx. 12 sq. mm.).

The values of the resistors and the condensers are determined by the time constant required for operation and the impedance of the transistors employed.

I claim:

In a selective receiver for consecutive electromagnetic signals of different frequencies and separated by predetermined respective time intervals, at least three interconnected tuned circuit selective filters, signal input means connected to said first filter, the first of said filters being tuned to pass a signal of one frequency, the second being tuned to pass a signal of another frequency, and the third to pass a signal of a third frequency, a first transistor having a base, emitter and collector, a capacitor, means connecting said first filter and said capacitor in series with said base and emitter, means connecting the second filter in series with said collector and emitter, means biasing the first transistor into the conductive state, means to change the bias to render the first transistor non-conductive upon passage of a signal at the first frequency through the first filter, a second transistor connected to the third filter, means biasing the second transistor to a non-conductive condition, the second filter being connected to the biasing means, and means to generate bias upon the passage of a signal of the second frequency through the second filter so as to render the second transistor conductive upon the passage of a signal at the third frequency through the third filter.

References Cited in the file of this patent

UNITED STATES PATENTS

| | | |
|---|---|---|
| 2,290,570 | Paddle | July 21, 1942 |
| 2,484,680 | Bossart | Oct. 11, 1949 |
| 2,572,074 | Terry | Oct. 23, 1951 |
| 2,577,755 | Hargreaves | Dec. 11, 1951 |
| 2,591,937 | Herrick | Apr. 8, 1952 |
| 2,600,405 | Hoeppner | June 17, 1952 |
| 2,658,112 | Davison | Nov. 3, 1953 |
| 2,824,174 | Holman | Feb. 18, 1958 |
| 3,022,493 | Tschumi et al. | Feb. 20, 1962 |